US011010149B2

(12) United States Patent
Viana et al.

(10) Patent No.: US 11,010,149 B2
(45) Date of Patent: May 18, 2021

(54) SHARED MIDDLEWARE LAYER CONTAINERS

(71) Applicant: International Business Machines Corporation, Armonk, NY (US)

(72) Inventors: Phillip Luiz Viana, Austin, TX (US); Yi Qun Zhang, Shanghai (CN); Mirza Baig, Grand Prairie, TX (US); Li Long Chen, Beijing (CN); Yan Du, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/373,736

(22) Filed: Apr. 3, 2019

(65) Prior Publication Data
US 2020/0319868 A1    Oct. 8, 2020

(51) Int. Cl.
*G06F 9/445* (2018.01)
*G06F 8/61* (2018.01)
*G06F 9/44* (2018.01)
*H04L 29/08* (2006.01)

(52) U.S. Cl.
CPC .............. *G06F 8/63* (2013.01); *G06F 8/61* (2013.01); *G06F 9/44* (2013.01); *G06F 9/44505* (2013.01); *H04L 67/10* (2013.01); *H04L 67/34* (2013.01)

(58) Field of Classification Search
CPC ........ G06F 9/466; G06F 9/5061; G06F 21/44; G06F 9/45533; G06F 9/4881; G06F 11/079; G06F 9/44505; G06F 9/44; G06F 8/63; H04L 47/70; H04L 67/34; H04L 67/10; G06Q 30/0621
See application file for complete search history.

(56) References Cited

U.S. PATENT DOCUMENTS

| 8,739,157 | B2 | 5/2014 | Ho et al. |
| 9,336,060 | B2 | 5/2016 | Nori et al. |
| 9,754,303 | B1* | 9/2017 | Jagtap ................ G06Q 30/0621 |
| 9,866,433 | B1 | 1/2018 | Fakhouri et al. |
| 9,983,909 | B1* | 5/2018 | Tyde, III ............... G06F 9/4881 |
| 2012/0102486 | A1 | 4/2012 | Yendluri |
| 2012/0159523 | A1* | 6/2012 | Kulkarni ............... G06F 9/5061 719/328 |
| 2013/0246368 | A1* | 9/2013 | Parkinson ............... G06F 9/466 707/674 |
| 2014/0195663 | A1 | 7/2014 | Hirschenberger et al. |

(Continued)

FOREIGN PATENT DOCUMENTS

CN    103957270 B    4/2017

OTHER PUBLICATIONS

"Docker: portable containers for consistent development and deployment", Quintagroup, Copyright 2002-2019, printed Jan. 24, 2019, 5 pages. https://quintagroup.com/cms/technology/docker.

(Continued)

*Primary Examiner* — Tuan A Vu
(74) *Attorney, Agent, or Firm* — Daniel C. Housley (57) ABSTRACT

Methods, computer program products, systems are provided. The method comprises receiving a request to install an application. A middle-share container corresponding to the application is then created and provisioned upon a shared middleware layer. Middleware components that the application needs are pre-installed and pre-configured in the shared middleware layer.

20 Claims, 7 Drawing Sheets

(56) References Cited

U.S. PATENT DOCUMENTS

| | | | |
|---|---|---|---|
| 2015/0120900 A1 | 4/2015 | Sahoo et al. | |
| 2015/0281111 A1* | 10/2015 | Carl | H04L 47/70 709/226 |
| 2016/0378518 A1* | 12/2016 | Antony | G06F 9/45533 718/1 |
| 2017/0300697 A1* | 10/2017 | Iyer | G06F 21/44 |
| 2019/0102206 A1* | 4/2019 | Fichtenholtz | G06F 9/44505 |
| 2020/0073739 A1* | 3/2020 | Rungta | G06F 11/079 |

OTHER PUBLICATIONS

Collier et al., "Operating and managing an Atomic container-based infrastructure", Red Hat Summit, Jun. 2015, 39 pages. https://www.redhat.com/files/summit/2015/13831_operating-and-managing-an-atomic-container-based-infrastructure.pdf.

Mell et al., "The NIST Definition of Cloud Computing", Recommendations of the National Institute of Standards and Technology, Sep. 2011, 7 pages.

\* cited by examiner

SHARED MIDDLEWARE LAYER CONTAINERS

BACKGROUND

The present application relates to cloud computing, and more specifically, to methods, systems and computer program products for provisioning containers.

Cloud computing is shared pools of configurable computer system resources and higher-level services that can be rapidly provisioned with minimal management effort, often over the Internet. Cloud computing relies on sharing of resources to achieve coherence and economies of scale, similar to a public utility. Third-party clouds enable organizations to focus on their core business instead of expending resources on computer infrastructure and maintenance. Cloud computing allows companies to avoid or minimize up-front IT infrastructure costs, in the meantime it allows enterprises to get their applications up and running faster, with improved manageability and less maintenance, and enables IT teams to more rapidly adjust resources to meet fluctuating and unpredictable demand.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment of the present disclosure, there is provided a computer implemented method. A request to install an application is received. A container corresponding to the application is then determined and provisioned upon a shared middleware layer. Middleware components that the application needed are pre-installed and pre-configured in the shared middleware layer.

Computer program products and computer systems are also provided.

These and other features and advantages of the present disclosure will be described in, or will become apparent to those of ordinary skill in the art in view of, the following detailed description of the example embodiments of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the disclosure can be deployed on cloud computer systems which will be described in the following. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
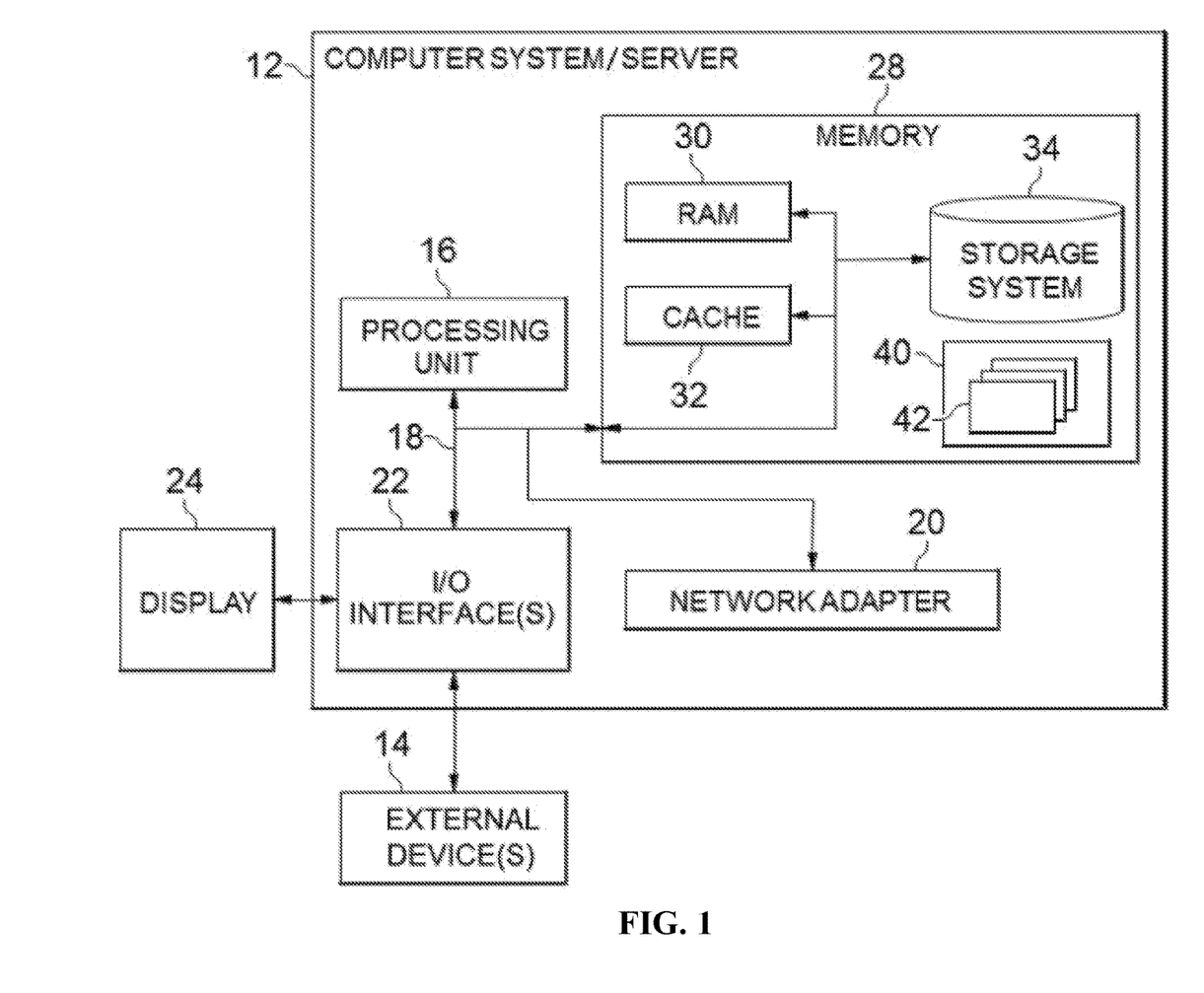
FIG. 1 depicts a cloud computing node according to an embodiment of the present disclosure.
Figure 2:
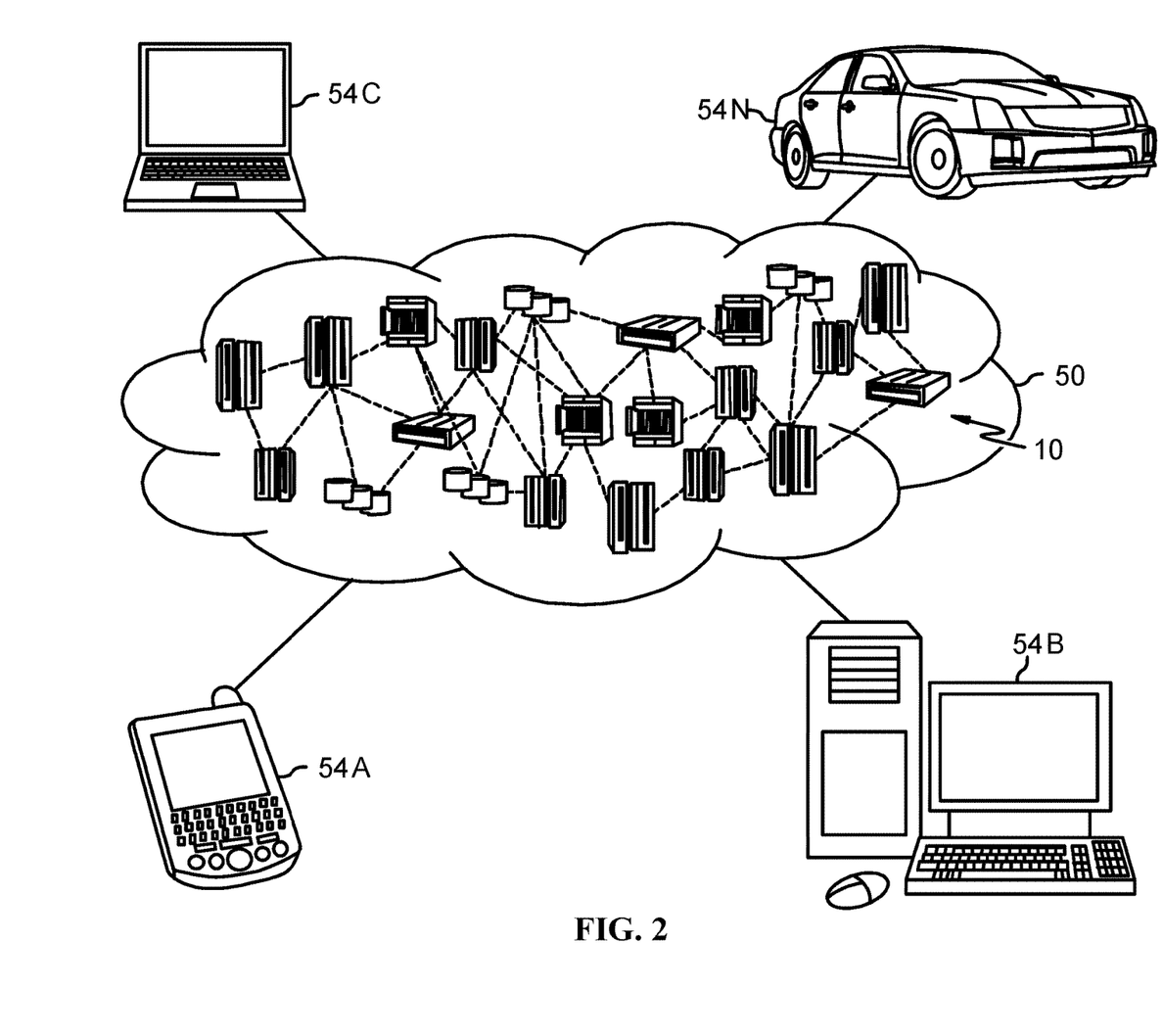
FIG. 2 depicts a cloud computing environment according to an embodiment of the present disclosure.

Referring now to FIG. 1, a schematic of an example of a cloud computing node is shown (e.g., cloud computing node 10 of FIG. 2). Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in. The components of computer system/server 12 may include, but are not limited to, one or more processors or processing units 16, a system memory 28, and a bus 18 that communicatively couples various system components, including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
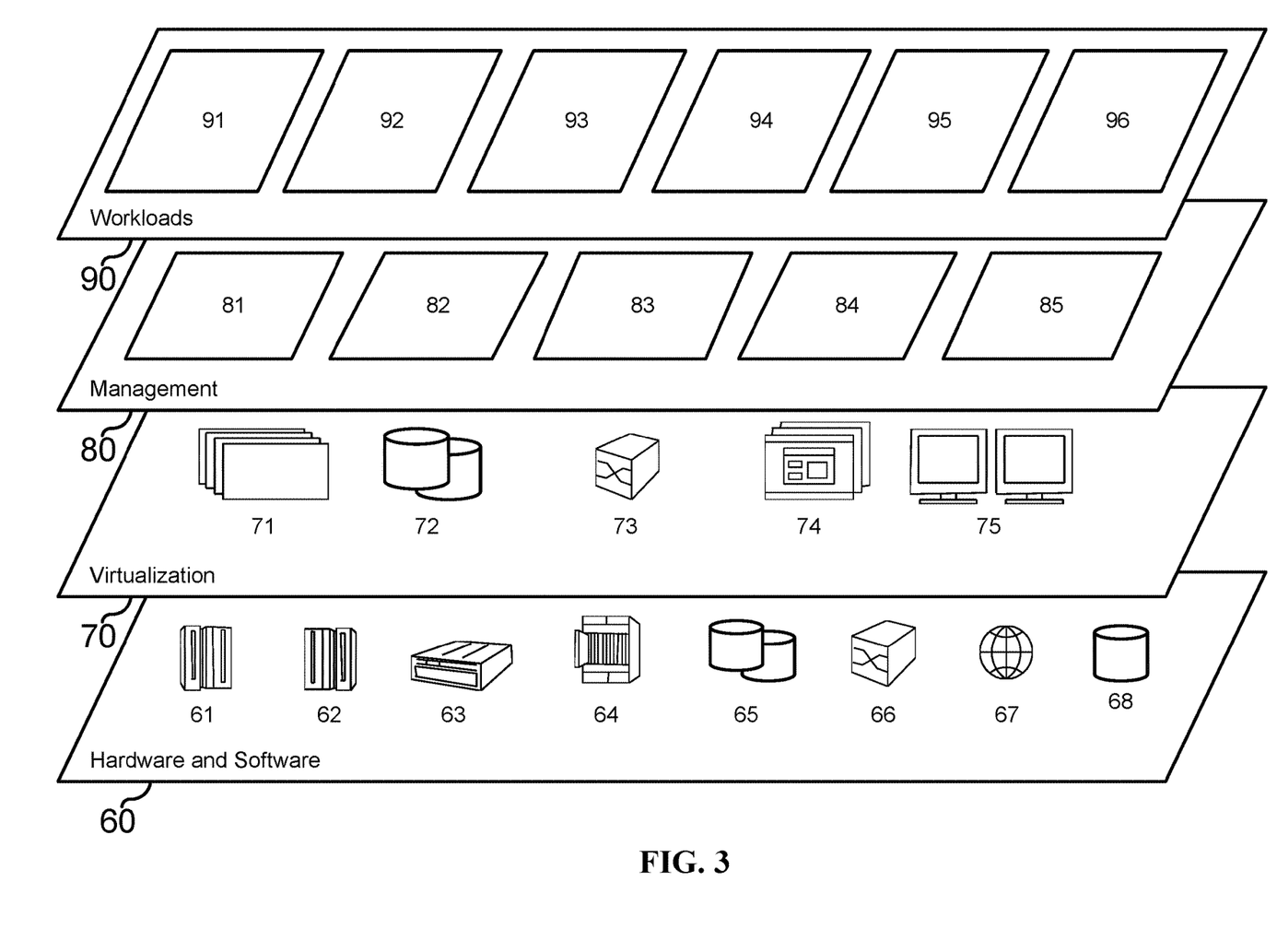
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container provisioning 96, according to embodiments of the disclosure.

Aside from the service models discussed above, Container as a Service (CaaS) is another trending cloud service model developed with the containerization technology in which a kernel of an operating system allows the existence of multiple isolated user-space instances. Such instances, called containers, may look like real computers from the point of view of applications running inside them. A computer application running on an ordinary operating system can see all resources of that computer, such as connected devices, files and folders, network shares, CPU power, quantifiable hardware capabilities, and the like. However, applications running inside a container can only see the container's contents and devices assigned to the container. A container is dependent on the operating system it runs on. CaaS allows users to manage and deploy containers, applications and clusters through container-based virtualization. CaaS is often considered to be a subset of IaaS including containers as its fundamental resource, as opposed to bare metal systems and virtual machines (VMs). Key differentiators of containers compared to VMs are packaging, portability, created as fit for purpose and therefore lower footprint and startup times, repeatability, better resource utilization of servers, and better integration into the whole development ecosystem, such as Continuous Integration/Delivery lifecycle. Containers with an application running inside it can be built, shipped, and run anywhere: on a laptop, on test systems, in pre-production, and in production systems and the like. This is all without changes to any content of the container and the application inside.

While CaaS provides a new flexible type of cloud service model, current container-based application deployment mode, such as pre-installed docker images, does not focus on the binding between middleware and applications. From user perspective, the binding process between middleware and application is quite complicated and time-consuming, as it typically needs customized installation and configuration process. Also, a specific application typically needs its proprietary middleware and customized installation and configuration due to the poor reusability of existing middleware images or instances, which further results in a waste of resources. Further, upgrade, backup, capacity expansion, live migration or hot reloading of the application during production phase may further require a lot of efforts due to the complexity of its installation and configuration of its middleware.

Embodiments of the present disclosure provide improved CaaS with better flexibility and efficiency for existing CaaS by introducing containers that utilize a shared middleware layer (hereinafter referred to as "middle-share containers"), so that multiple containers may share the same middleware layer. According to embodiments of the present disclosure, a middle-share container is bundled with an application which includes its core application files and its configurations, encapsulated into the container. A middle-share container may run on a shared middleware layer in which middleware components the application needed are pre-installed and pre-configured, e.g., by the service provider. In such way, a middle-share container may be provided as a service instance which functions as the application. From user perspective, users of middle-share containers do not need to have the knowledge of the complicated processes of customized installation or configuration to bind the middleware components and the application, merely need to install and configure the application itself. A plurality of middle-share containers running on the same shared middleware layer is dependent upon the same or similar the middleware components pre-installed and pre-configured in the shared middleware layer and are isolated from each other.

Figure 4:
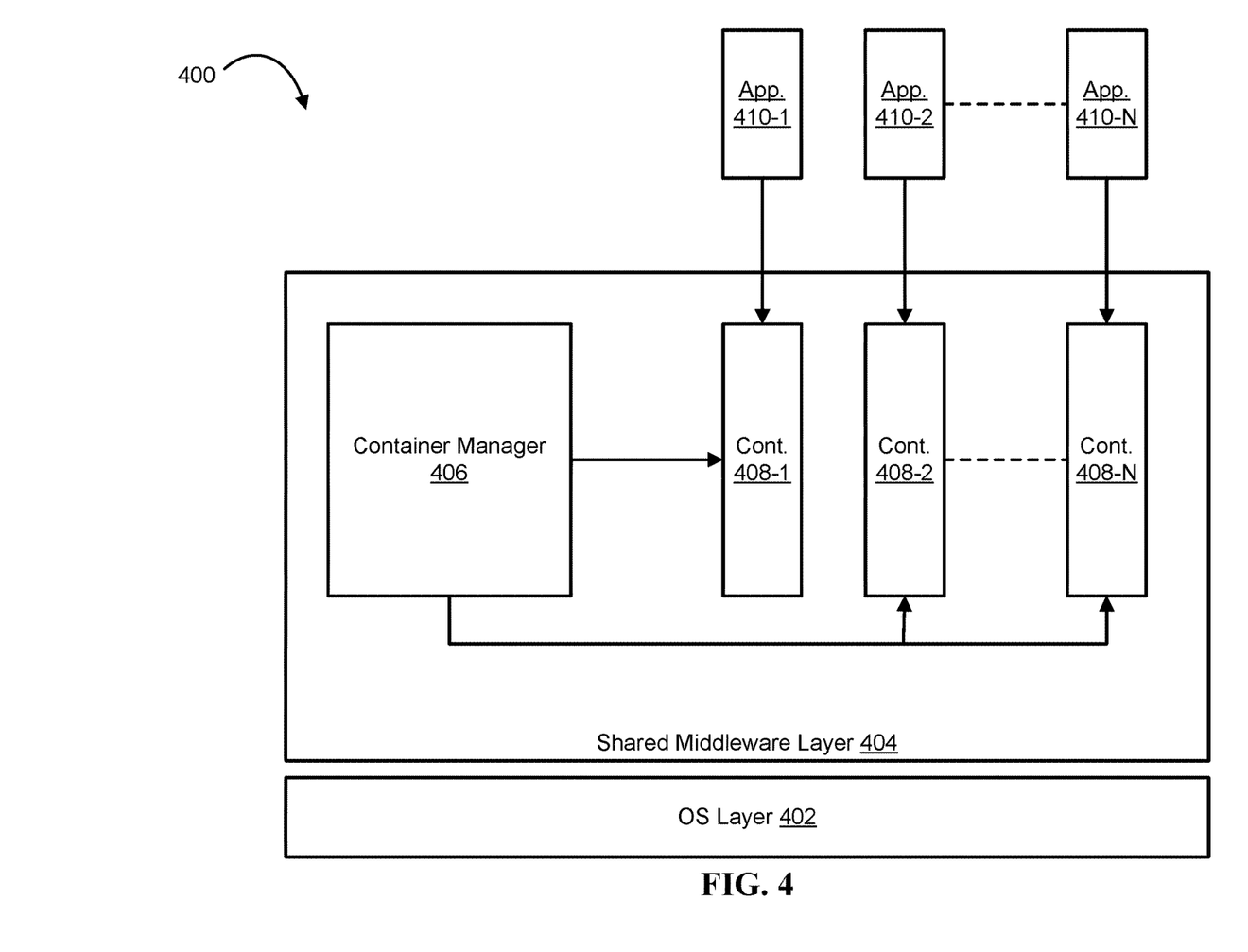
FIG. 4 depicts a diagram of an overview structure of improved CaaS at runtime according to an embodiment of the present disclosure.

Referring now to FIG. 4, which depicts a diagram of an overview structure 400 of improved CaaS at runtime according to an embodiment of the present disclosure. As shown in FIG. 4, the improved CaaS is a layered structure 400. An operating system (OS) layer 402 is at the bottom of the layered structure with host OS running in it. The host OS running in the OS layer 402 may be any types of modern operating systems that support containerization technologies existing now or developed in the future, and typically only comprises core functionalities of the host OS, referred as "kernel," with complete control over everything in the system. An example of the host OS may be Unix-based OS (e.g., BSD, IBM® AIX®, Sun Microsystems® Solaris®, etc.), Linux-based OS (e.g., CentOS, Debian, Fedora, OpenSUSE, Ubuntu, etc.), Microsoft® Windows® based OS, or any other types of suitable OS. According to an embodiment of the present disclosure, the host OS may further comprise additional functionalities dependent upon other requirements of the system, e.g., security module where security is a major concern.

Above the OS layer 402 is a shared middleware layer 404 in which middleware components are pre-installed and pre-configured. As aforementioned, the plurality of middle-share containers 408-1, 408-2, . . . , 408-n run upon the same shared middleware layer 404, therefore, the middleware components pre-installed and pre-configured in the shared middleware layer 404 are shared by the plurality of middle-share containers 408-1, 408-2, . . . , 408-n and hence support respective applications 410-1, 410-2, . . . , 410-n running inside the plurality of middle-share containers 408-1, 408-2, . . . , 408-n. That is to say, the applications 410-1, 410-2, . . . , 410-n depend upon the same or similar middleware components that are pre-installed and pre-configured in the shared middleware layer 404 which provide a link between host OS running in the OS layer 402 and the plurality of middle-share containers 408-1, 408-2, . . . , 408-n. The shared middleware layer 404 supports the applications 410-1, 410-2, . . . , 410-n running inside their respective middle-share containers 408-1, 408-2, . . . , 408-n.

A container manager 406 is responsible for the lifecycle management of the plurality of middle-share containers 408-1, 408-2, . . . , 408-n at runtime runs above the shared middleware layer 404. In its lifecycle, a middle-share container undergoes various states like installed, running, paused, stopped, or uninstalled, similar to existing technologies. The lifecycle management will be discussed in detail later with reference to FIG. 7. A middle-share container may be provided by the container manager 406 as a service instance bound to the middleware components pre-installed and pre-configured in the shared middleware layer 404, providing functionalities of the application with which the middle-share container is bundled. According to an embodiment of the disclosure, the middle-share container may be stored as an image before its provisioning. The provisioned middle-share container may be encapsulated with the application it is bundled with, and may include core application files and configurations, as discussed herein. The configuration of the application may be received from users of the application, or from a configuration file.

A plurality of middle-share containers 408-1, 408-2, . . . , 408-n runs upon the shared middleware layer 404 and are managed by the container manager 406 at runtime, while corresponding applications 410-1, 410-2, . . . , or 410-n run inside each of the plurality of middle-share containers, as shown in FIG. 4. From a user's perspective, each middle-share container merely needs to install and configure the corresponding application itself, as the middleware components bound to the application have been pre-installed and pre-configured in the shared middleware layer 404. There is no need for users to install and configure middleware upon which the application is dependent.

The structure of the improved CaaS provides users of an application with a simplified process to install the application. Users of the application do not need to install or configure middleware upon which the application is dependent, as it has been pre-installed and pre-configured in the shared middleware layer. Therefore, the improved CaaS provides an even more flexible model of CaaS, compared to existing CaaS.

Figure 5:
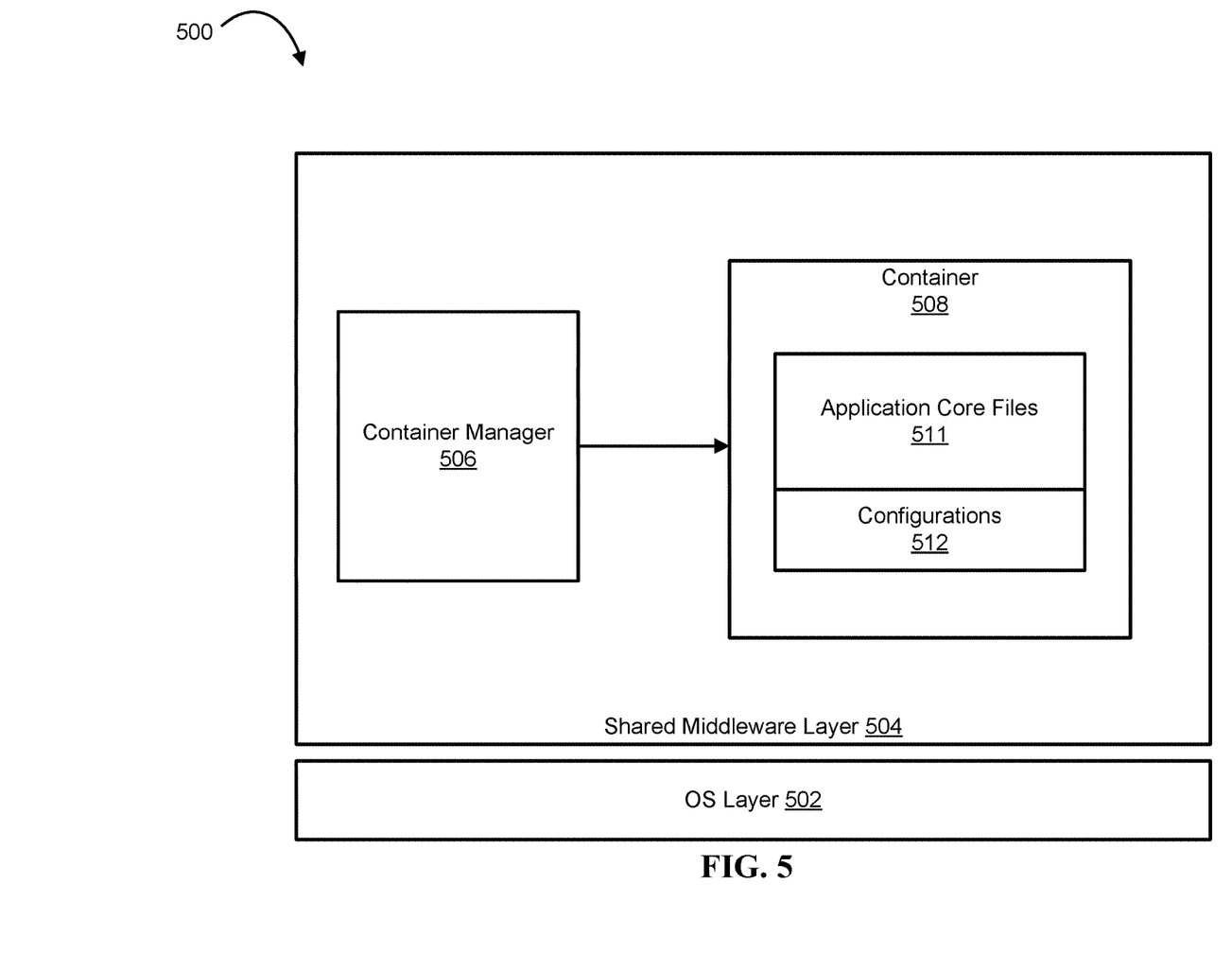
FIG. 5 depicts a diagram of a container of improved CaaS at runtime according to an embodiment of the present disclosure.

Now referring to FIG. 5, which depicts a diagram 500 of a middle-share container in an improved CaaS at runtime, according to an embodiment of the present disclosure. An OS layer 502, a shared middleware layer 504, and a container manager 506 in FIG. 5 are similar to the OS layer 402, the shared middleware layer 404 and the container manager 406 in FIG. 4; however, middle-share container 508 is shown in greater detail. The middle-share container 508 is managed by the container manager 506, as discussed above with reference to FIG. 4. The container manager 506 is responsible for the lifecycle management of the middle-share container 508, inside which an application with its core files 511 and its configurations 512 runs. The middleware components that the application running inside the middle-share container 508 needs are pre-installed and pre-configured in the middleware layer 504, similar to what was discussed with reference to FIG. 4. The middle-share container 508 is provided as a service instance to users of the middle-share container 508. As the middleware components needed by the application have been pre-installed and pre-configured in the shared middleware layer 504, the users of the middle-share container 508 only need to install and configure the application itself without the need to worry about the installation and configuration of the middleware components.

Figure 6:
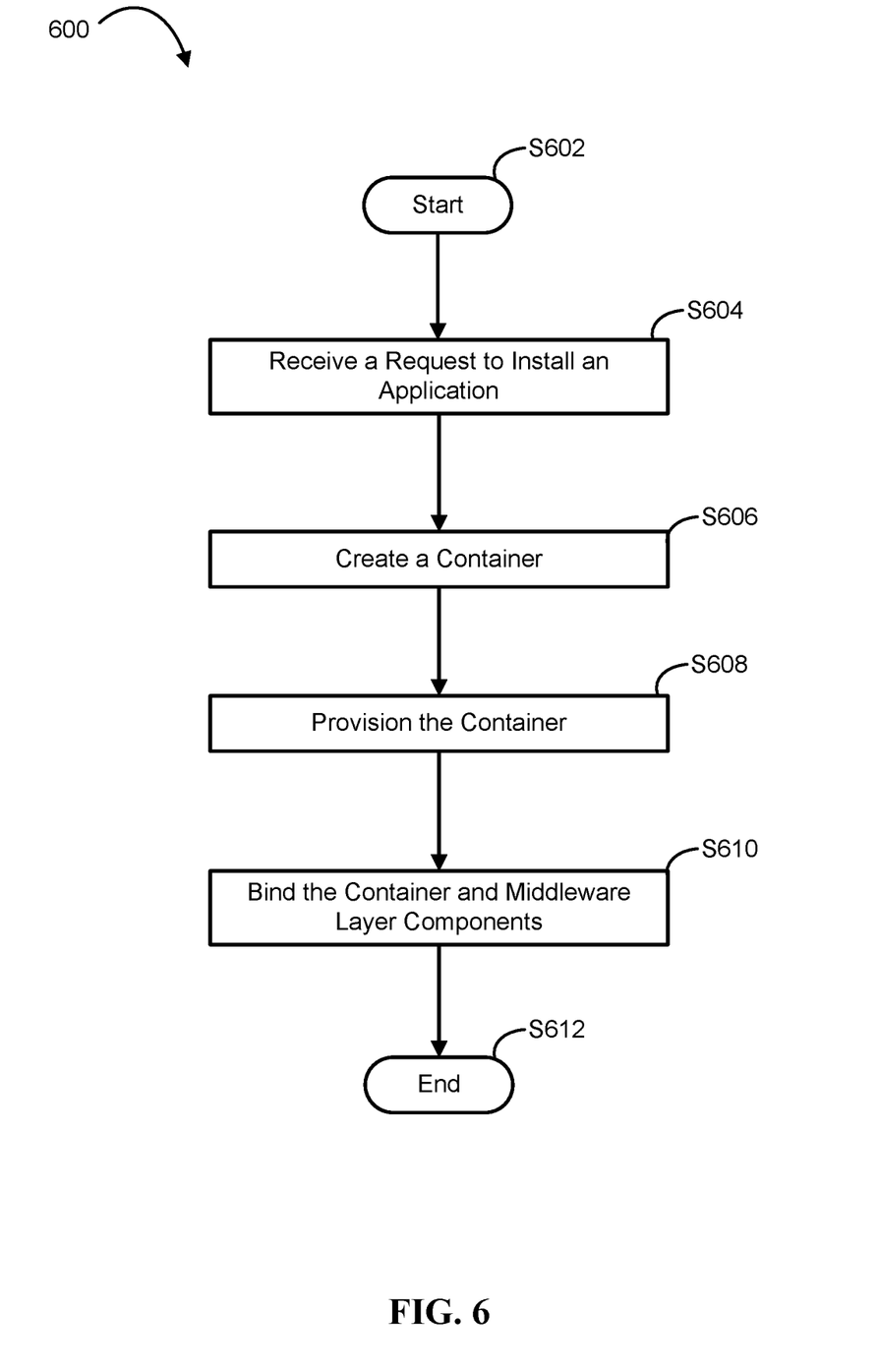
FIG. 6 depicts a flowchart of an example method according to an embodiment of the present disclosure.

Referring now to FIG. 6, which depicts a flowchart of an exemplary method 600, according to an embodiment of the present disclosure. The method 600 may be implemented e.g., by the container manager 406, 506 and starts at step S602. Then it flows into step S604 in which a request to install an application is received. In embodiments, the request may be received from a user. A middle-share container corresponding to the application is created in step S606. A middle-share container, according to embodiments of the present disclosure, is bundled with the application and includes its core application files and configurations, and is encapsulated into the middle-share container. The middle-share container may be stored in an image file before provisioning, in which case an image corresponding to the application may also be created in step S606. Then, method 600 enters step S608, in which the middle-share container is provisioned upon a shared middleware layer where the middleware components needed by the application are pre-installed and pre-configured. According to an embodiment of the present disclosure, the provisioning of the middle-share container comprises installing the application with the configurations and binding the application to middleware components that are pre-installed and pre-configured in the shared middleware layer. Alternatively, the middle-share container may be bound to the middleware components that are pre-installed and pre-configured in the shared middleware layer in step S610. The middle-share container is then started and provided as a service instance bound to the middleware components.

According to an embodiment of the present disclosure, the middleware components that re pre-installed and pre-configured in the shared middleware layer may be shared with other middle-share containers. The middle-share containers, however, are isolated from each other.

Figure 7:
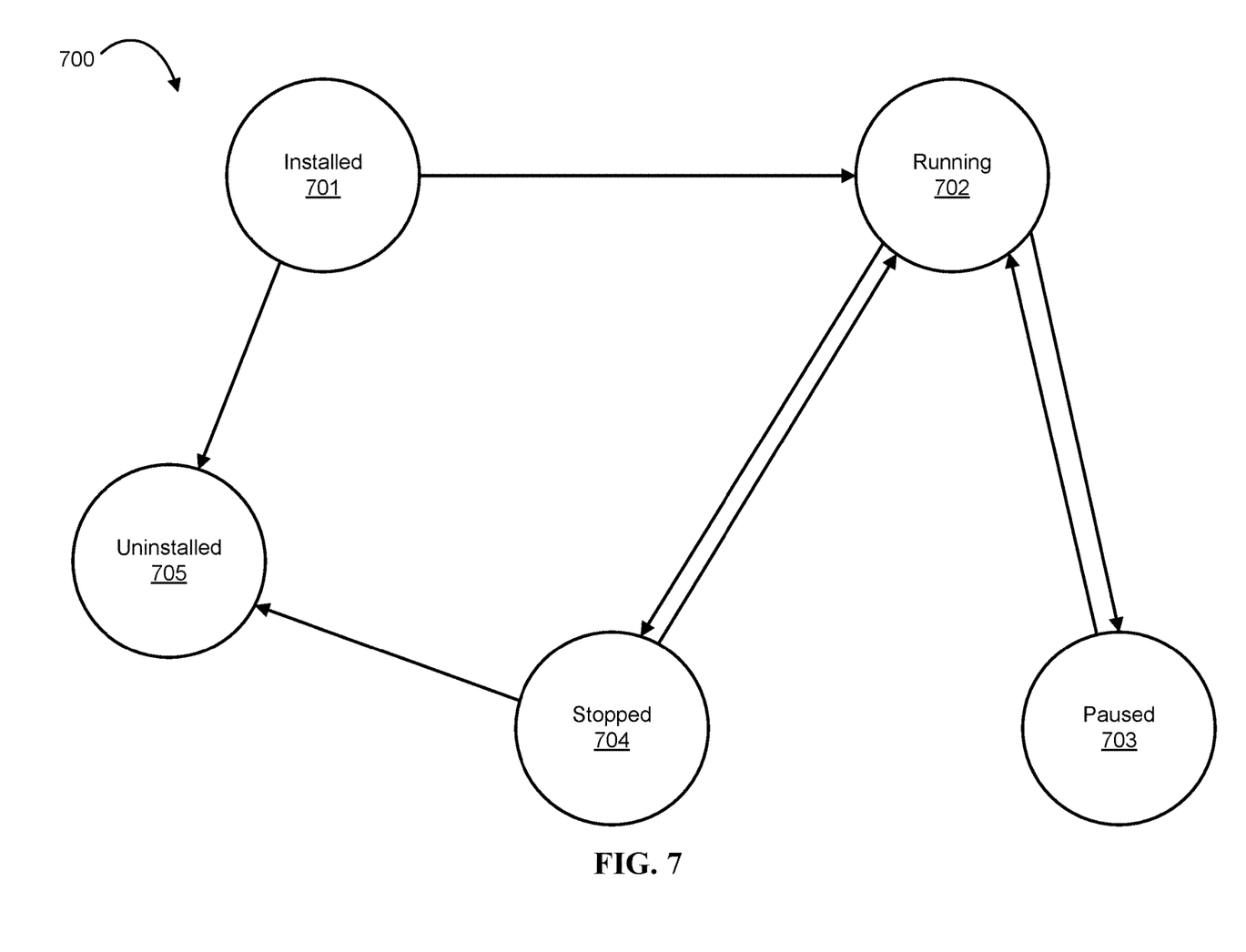
FIG. 7 depicts different states in a lifecycle of a container according to an embodiment of the present disclosure.

Referring now to FIG. 7, depicted is a diagram 700 of the different states in a lifecycle of a middle-share container, according to an embodiment of the present disclosure. As shown in FIG. 7, there are five different states in a lifecycle of a container which are:

INSTALLED 701: the middle-share container has been created and installed with the application, e.g., the application has been installed, configured inside the middle-share container, and bound to the middleware components pre-installed and pre-configured in the shared middleware layer. The middle-share container is ready to start.

RUNNING 702: the middle-share container is running and functioning as the application, providing functionalities of the application.

PAUSED 703: the middle-share container is paused, and it stops providing functionalities of the application temporarily, pending for further instructions.

STOPPED 704: the middle-share container is stopped, and it stops providing functionalities of the application.

UNINSTALLED 705: the middle-share container has been uninstalled with the application, e.g., the middle-share container is terminated.

As mentioned herein, the container manager 406, 506 is responsible for lifecycle management of middle-share containers. Upon receiving a request to install an application, (e.g., at step S604 of FIG. 6), the container manager 406, 506 creates (e.g., at step S606 of FIG. 6) a middle-share container corresponding to the application. The created middle-share container is bundled with both core files and configurations of the application. The configurations of the application may be received from users of the application, or from a configuration file. The container manager 406, 506 then provisions (e.g., at step S608 of FIG. 6) the created middle-share container upon the shared middleware layer 404, 504, where middleware components the application requires are pre-installed and pre-configured. The provisioning of the middle-share container comprises installing the application with the configurations and binding the application to the middleware components pre-installed and pre-configured in the shared middleware layer (e.g., at step S610 of FIG. 6). After the installation, configuration and binding process, the middle-share container enters INSTALLED 701 state.

The container manager 406, 506 then initiates a 'start' instruction to start the middle-share container after receiving an instruction from users of the application to start the application. The middle-share container starts and enters RUNNING 702 state with the execution of the 'start' instruction, as the application has been installed, configured, and bound to the middleware components pre-installed and pre-configured in the shared middleware layer. The middle-share container in RUNNING 702 state functions as the application provides functionalities of the application running inside it. Users of the application may utilize the middle-share container via the application and access the functionalities of the application. If a 'pause' instruction is received from the container manager 406, 506 to suspend the middle-share container, the middle-share container enters PAUSED 703 state pending for further instructions, in which it stops providing functionalities of the application, temporarily. A 'resume' instruction may follow and the middle-share container then re-enters RUNNING 702 state.

If a 'stop' instruction is received from the container manager 406, 506, the middle-share container enters STOPPED 704 state in which it stops providing functionalities of the application. A 'stop' instruction may be triggered when the middle-share container terminates due to certain problems, e.g., an Out-of-Memory error. If a 'restart' instruction is received from the container manager 406, 506, the middle-share container restarts and re-enters RUNNING 702 state. A 'restart' instruction may be triggered after the middle-share container terminates due to certain problems it encounters, e.g., an Out-of-Memory error.

If users of the application decide to stop using the application, the container manager 406, 506 may initiate an 'uninstall' instruction after receiving an instruction to uninstall the application. Then the middle-share container enters UNINSTALLED 705 state where the middle-share container bundled to the application is terminated.

In the above, embodiments of the present disclosure are discussed with references to figures. As the middleware components shared by a plurality of middle-share containers are pre-installed and configured, users do not need to go through the complicated processes of installation and configuration of middleware. In the meantime, as middle-share containers are provided as service instances with the middleware components pre-installed and pre-configured, upgrade, backup, capacity expansion, live migration, or hot reloading becomes much easier, as again, users do not need to go through the complicated processes of installation and configuration of middleware. CaaS provider may initiate upgrades and/or capacity expansions from the provider side actively or upon the request of users, while users may initiate backup, live migration, and hot reloading from the middle-share container level, without considering the complicated processes of installation and configuration of middleware.

It should be noted that the method according to embodiments of this disclosure could be implemented by computer system/server 12 of FIG. 1.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving a request to install an application within a container as a service environment;
generating an image of a middle-share container with the application installed thereon;
creating, using the image, the middle-share container corresponding to the application;
receiving, from a user, a configuration for the application;
provisioning the middle-share container upon a shared middleware layer within the container as a service environment, the middleware layer providing a link between the middle-share container and an operating system, wherein a set of middleware components required by the application is pre-installed and pre-configured, according to the received configuration, by a service provider in the shared middleware layer;
wherein the middle-share container is portable to a second container as a service environment;
wherein the middle-share container is a first middle-share container of a plurality of middle-share containers on the shared middleware layer;
wherein the plurality of middle-share containers is running instances of the application using the operating system; and
wherein the set of middleware components are employed to concurrently support the plurality of middle-share containers running the application.

2. The method of claim 1, wherein the middle-share container is bundled with the application, the bundle including core application files and configurations for the application.

3. The method of claim 1, further comprising binding the middle-share container and the set of middleware components.

4. The method of claim 3, further comprising starting the middle-share container, in response to the provisioning of the middle-share container, and wherein the request to install an application is received in response to an identified need for an upgrade, a backup, a capacity expansion, a live migration, or a hot reloading.

5. The method of claim 1, wherein the provisioned middle-share container is provided as a service instance bound to the set of middleware components.

6. The method of claim 1, wherein the set of middleware components are shared with at least one other middle-share container, wherein the middle-share container and the at least one other container are isolated from each other.

7. The method of claim 1, further comprising managing a lifecycle of the middle-share container, wherein a set of lifecycles of a plurality of containers, including the middle-share container, is managed concurrently by a container manager.

8. The method of claim 1, wherein software is provided as a service in a cloud environment to perform the method.

9. A computer program product, the computer program product comprising a computer readable storage having program instructions embodied therewith, the program instructions executable by a computer, to cause the computer to:
receive a request to install an application within a container as a service environment;
generate an image of a middle-share container with the application installed thereon;
create, using the image, the middle-share container corresponding to the application;
receive, from a user, a configuration for the application;
provision the middle-share container upon a shared middleware layer within the container as a service environment, the middleware layer providing a link between the middle-share container and an operating system, wherein a set of middleware components required by the application is pre-installed and pre-configured, according to the received configuration, by a service provider in the shared middleware layer;
wherein the middle-share container is portable to a second container as a service environment;
wherein the middle-share container is a first middle-share container of a plurality of middle-share containers on the shared middleware layer;
wherein the plurality of middle-share containers is running instances of the application using the operating system; and
wherein the set of middleware components are employed to concurrently support the plurality of middle-share containers running the application.

10. The computer program product of claim 9, wherein the middle-share container is bundled with the application, the bundle including core application files and configurations for the application.

11. The computer program product of claim 9, wherein the program instructions further cause the computer to bind the middle-share container and the set of middleware components.

12. The computer program product of claim 11, wherein the program instructions further cause the computer to start the middle-share container, in response to the provisioning of the middle-share container, and wherein the request to install an application is received in response to an identified need for an upgrade, a backup, a capacity expansion, a live migration, or a hot reloading.

13. The computer program product of claim 9, wherein the provisioned middle-share container is provided as a service instance bound to the set of middleware components.

14. The computer program product of claim 9, wherein the set of middleware components are shared with at least one other middle-share container, wherein the middle-share container and the at least one other container are isolated from each other.

15. A system, the system comprising:
a processor;
memory accessible by the processor; and
computer program instructions stored in the memory and executable by the processor to cause the system to:
receive a request to install an application within a container as a service environment;
generate an image of a middle-share container with the application installed thereon;
create, using the image, the middle-share container corresponding to the application;
receive, from a user, a configuration for the application;
provision the middle-share container upon a shared middleware layer within the container as a service environment, the middleware layer providing a link between the middle-share container and an operating system, wherein a set of middleware components required by the application is pre-installed and pre-configured, according to the received configuration, by a service provider in the shared middleware layer;

wherein the middle-share container is portable to a second container as a service environment;

wherein the middle-share container is a first middle-share container of a plurality of middle-share containers on the shared middleware layer;

wherein the plurality of middle-share containers is running instances of the application using the operating system; and wherein the set of middleware components are employed to concurrently support the plurality of middle-share containers running the application.

16. The system of claim 15, wherein the middle-share container is bundled with the application, the bundle including core application files and configurations for the application.

17. The system of claim 15, wherein the program instructions further cause the system to bind the middle-share container and the set of middleware components.

18. The system of claim 17, wherein the program instructions further cause the system to start the middle-share container, in response to the provisioning of the middle-share container, and wherein the request to install an application is received in response to an identified need for an upgrade, a backup, a capacity expansion, a live migration, or a hot reloading.

19. The system of claim 15, wherein the provisioned middle-share container is provided as a service instance bound to the set of middleware components.

20. The system of claim 15, wherein the set of middleware components are shared with at least one other middle-share container, wherein the middle-share container and the at least one other container are isolated from each other.

* * * * *